J. R. GOEHRING.
VALVE.
APPLICATION FILED JUNE 23, 1908.
918,143.
Patented Apr. 13, 1909.
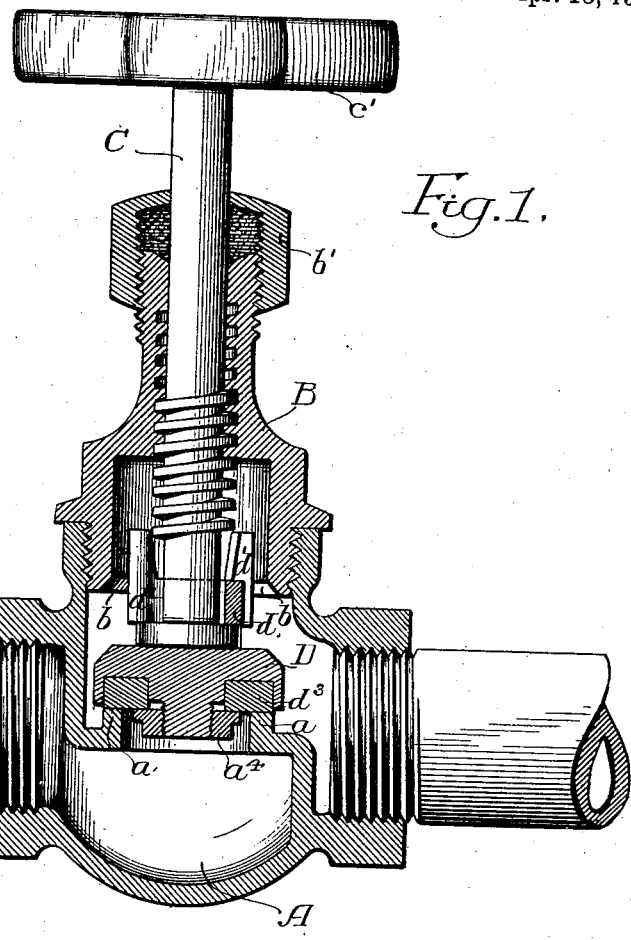
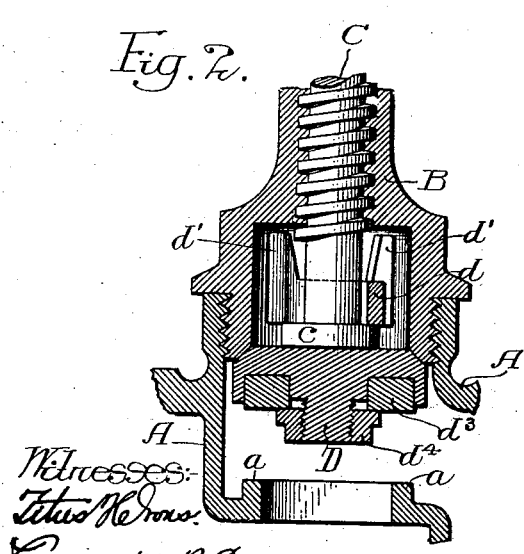
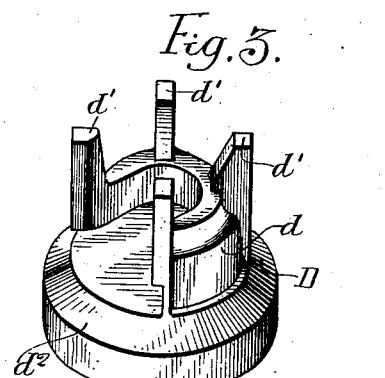
Inventor
John R. Goehring.
by his Attorneys
Howson & Howson

UNITED STATES PATENT OFFICE.

JOHN R. GOEHRING, OF PHILADELPHIA, PENNSYLVANIA.

VALVE.

No. 918,143.  Specification of Letters Patent.  Patented April 13, 1909.

Application filed June 23, 1908. Serial No. 439,990.

*To all whom it may concern:*

Be it known that I, JOHN R. GOEHRING, a citizen of the United States, residing in Philadelphia, Pennsylvania, have invented certain Improvements in Valves, of which the following is a specification.

One object of my invention is to provide a stop valve which shall have guiding means for its stem, and a movable member so constructed and placed as to materially simplify the construction of the valve while at the same time permitting of the convenient removal and renewal of such part in the event of its becoming worn.

Another object of the invention is to provide a valve whose parts shall be so constructed and arranged that it shall be possible to close off the stuffing box and to open and repack this when it is desired, without the necessity for taking the valve out of use or shutting off from it the fluid under pressure in the system to which it is connected.

I also desire to provide a stop valve in which the movable member is so constructed that when in its full open position, it performs the additional function of shutting off the stuffing box from the main passage through the valve, said movable member being also preferably equipped with guiding means whereby it is properly centered on the seat.

These and other advantageous ends I secure as hereinafter set forth, reference being had to the accompanying drawings in which:—

Figure 1, is a vertical section of a valve constructed according to my invention, the same being illustrated as closed; Fig. 2, is a fragmentary vertical section illustrating the valve with its movable member in the open position but with the stuffing box cut off from the main chamber of the valve, and Fig. 3, is a perspective view of the movable member or valve proper.

In the above drawings, A represents a valve casing of the well known globe form, having within it a seat $a$, and provided with a top opening closed by a bonnet B, which in the present instance screws into the casing, and has at its lower inner edge a seat $b$.

A threaded valve stem C operates in a suitably threaded passage formed through the bonnet structure and at its lower end is provided with a head $c$:—there being a stuffing box $b'$ at the upper end of the bonnet to prevent leakage from the interior of the valve casing around said stem. This latter is also provided with an operating handle $c'$.

The valve proper D is removably carried by the headed stem C in the well known manner, for it has extending upwardly from its body portion an inwardly flanged or overhung integral portion $d$ opening at one side to permit of the head and the adjacent portion of the stem being slid into position, so that their central line may correspond with the central line of the valve. Upon this integral head portion of the valve proper I form guides $d'$ which are also integral with this portion and with the valve. In the present instance there are four of these and they coöperate with the interior surface of the bonnet to keep the valve stem and valve properly positioned.

The edge of the upper face of the valve is beveled as indicated at $d^2$ so that it coöperates with the seat $b$, while the lower face of the valve is recessed for the reception of a packing ring $d^3$ designed to co-act with the seat $a$ and held in position by a nut $d^4$ threaded onto a central downwardly projecting portion of the valve.

With the above described arrangement of parts, when the stem is turned in the bonnet to open the passageway through the valve casing, the valve proper is caused to approach the lower edge of the bonnet and finally to seat thereon so as to completely close or shut off all access of fluid under pressure to the stuffing box, which may then be opened and packed when desired.

It will be noted that the guides $d'$ being extended upwardly from the head of the valve, in no way interfere with the closing off of the bonnet from the passage through the valve, for the distance between the outside surfaces of an opposite pair of guides is usually less than the diameter of the inner portion of the seat $b$. Moreover, it is obvious that when the guides or upper valve face become worn, the valve proper may be very easily removed and replaced.

I claim:—

The combination of a valve casing having a threaded portion and provided with a valve seat, a bonnet for the casing having a stuffing box and a seat, a valve stem passing through the stuffing box, and a valve carried by said stem, said valve having two seating portions capable of respectively coöperating with the valve seat of the casing and with the seat of the bonnet and being free to turn relatively to said seats, with projections on the valve placed to co-act with the interior of the bonnet to guide said valve while permitting its rotation.

In testimony whereof, I have signed my name to this specification, in the presence of two subscribing witnesses.

JOHN R. GOEHRING.

Witnesses:
    Jos. H. Klein,
    Wm. A. Barr.